(12) United States Patent
Crane et al.

(10) Patent No.: US 8,104,827 B2
(45) Date of Patent: Jan. 31, 2012

(54) BRACKET-HEADLAMP CARRIER ASSEMBLY

(75) Inventors: Michael Crane, Oakland Township, MI (US); Tom Cobb, Harrison Township, MI (US); Thomas M. Pilette, Lake Orion, MI (US)

(73) Assignee: Magna International Inc. (CA)

( * ) Notice: Subject to any disclaimer, the term of this patent is extended or adjusted under 35 U.S.C. 154(b) by 844 days.

(21) Appl. No.: 12/016,286

(22) Filed: Jan. 18, 2008

(65) Prior Publication Data

US 2008/0173775 A1    Jul. 24, 2008

Related U.S. Application Data

(60) Provisional application No. 60/881,341, filed on Jan. 19, 2007.

(51) Int. Cl.
*B60J 7/00*    (2006.01)
(52) U.S. Cl. .................. 296/203.02; 248/200; 362/506
(58) Field of Classification Search .................. 248/200, 248/205.1, 309.1; 296/193.09, 203.02; 362/506, 362/507; 280/500, 502, 495, 505
See application file for complete search history.

(56) References Cited

U.S. PATENT DOCUMENTS

| | | | |
|---|---|---|---|
| 3,964,612 A * | 6/1976 | Skilliter et al. | 211/26 |
| 5,788,363 A | 8/1998 | Kamaya et al. | |
| 6,926,434 B2 | 8/2005 | Baek | |
| 7,252,422 B2 | 8/2007 | Kim | |
| 7,644,966 B2 * | 1/2010 | Huber et al. | 293/155 |
| 2002/0125383 A1 * | 9/2002 | Takahashi | 248/200 |
| 2005/0023864 A1 | 2/2005 | Lazzeroni et al. | |
| 2005/0275250 A1 | 12/2005 | Wada | |
| 2006/0169855 A1 * | 8/2006 | Chen | 248/200 |
| 2006/0202517 A1 | 9/2006 | Pelini | |
| 2009/0114784 A1 * | 5/2009 | Tam | 248/205.1 |

FOREIGN PATENT DOCUMENTS

CA    2618575 A1    7/2008

* cited by examiner

*Primary Examiner* — A. Joseph Wujciak, III
(74) *Attorney, Agent, or Firm* — Warn Partners, P.C.; Marc Luddy

(57) ABSTRACT

The present invention is a component for providing alignment between at least two external components. The present invention is a bracket member having at least two attachment structures, and at least two externally visible components connected to the at least two attachment structures, and the at least two attachment structures provide adjustable positioning between the at least two externally visible components connected to the at least two attachment structures such that the position off the at least two externally visible components can be adjusted relative to one another.

6 Claims, 14 Drawing Sheets

US 8,104,827 B2

BRACKET-HEADLAMP CARRIER ASSEMBLY

This application claims the benefit of U.S. Provisional Application No. 60/881,341, filed Jan. 19, 2007.

FIELD OF THE INVENTION

The present invention relates to bracket assemblies which are used in the front end of an automobile; more particularly, the present invention relates to a bracket member which is used for controlling the relative positioning between a headlamp assembly, the front fascia or top cap, and a fender in an automobile.

BACKGROUND OF THE INVENTION

Fascias or top caps, as well as fenders and headlamps, are generally known and used throughout various types of automobiles. The fascia or top cap is a portion of the body which is typically positioned near, or below the headlights and grille, and is used for providing an aesthetically pleasing appearance. Fenders are a portion of the body which are adjacent to the fascia or top cap, and surrounds the wheel well. These fascias, top caps, and fenders are typically made of a composite material which can be difficult to dimension, as well as position relative to the headlights and one another such that the correct dimensions are achieved.

Often during assembly, due to tolerances and other manufacturing causes, the position of the headlight relative to the fascia (or top cap) or the fender is too large, leaving a gap between the headlight and the fascia or top cap, which detracts from the appearance of the automobile. It is desired to have a minimal gap between the headlight and front fascia or top cap, as well as the fascia and front fender of the automobile.

Accordingly, there exists a need for an improved way of controlling the dimensions between the headlight and the front fascia or top cap, and control the dimensions between the fender and front fascia or top cap.

SUMMARY OF THE INVENTION

The present invention is a component for providing alignment between at least two external components. The present invention is a bracket member having at least two attachment structures, and at least two externally visible components connected to the at least two attachment structures, and the at least two attachment structures provide adjustable positioning between the at least two externally visible components connected to the at least two attachment structures such that the position off the at least two externally visible components can be adjusted relative to one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
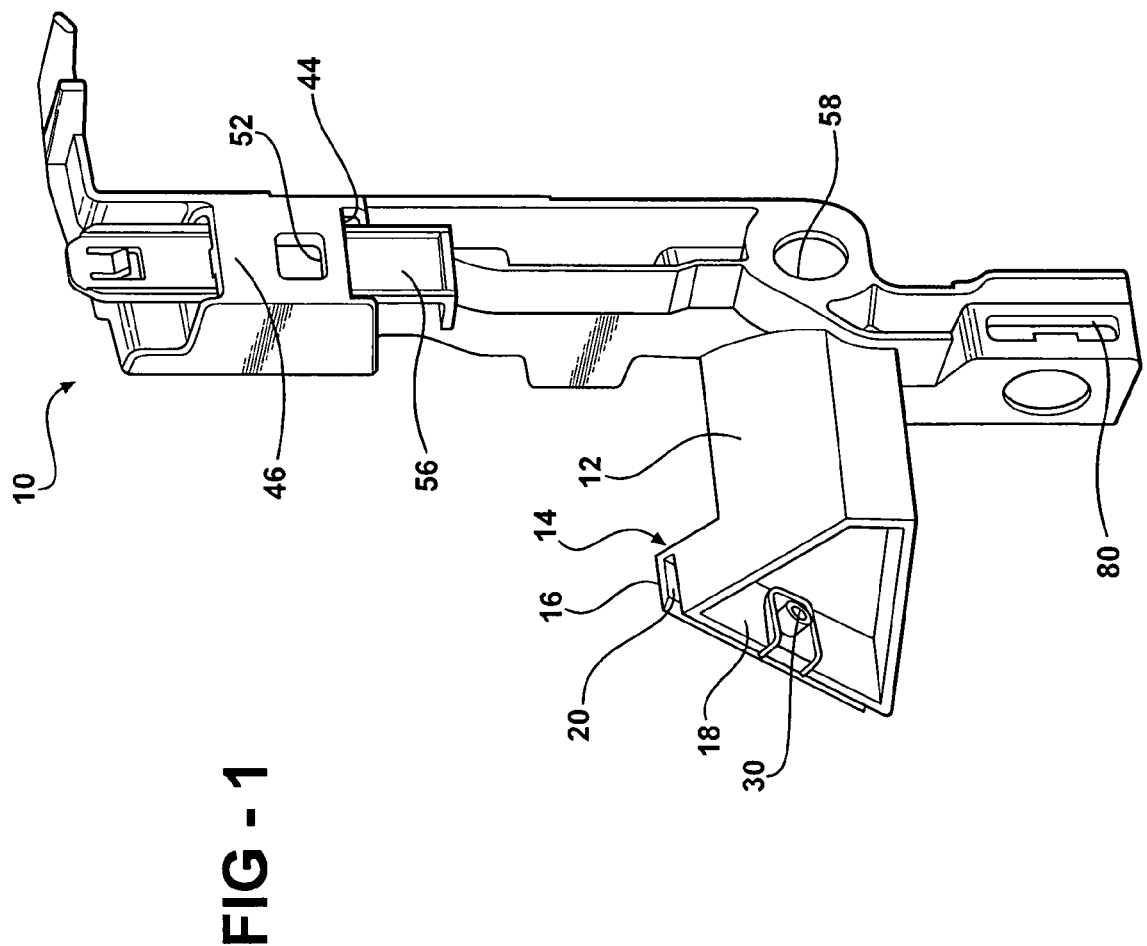
FIG. 1 is a perspective rear view of a bracket member, according to the present invention.
Figure 2:
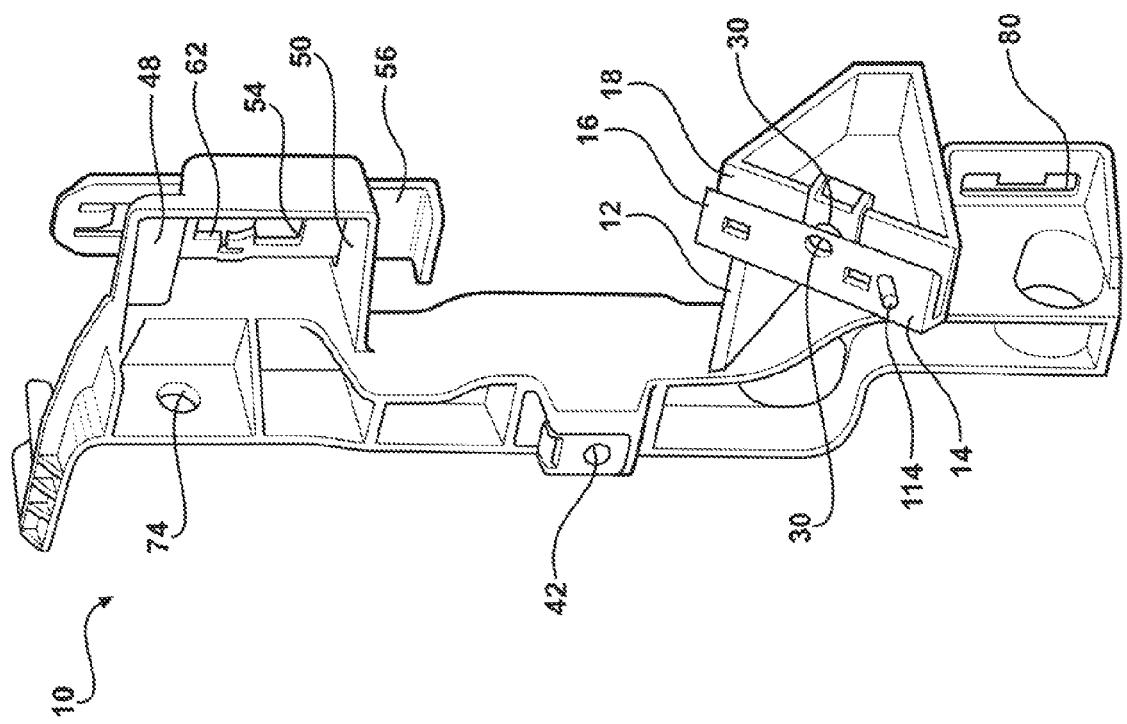
FIG. 2 is a first perspective rear view of a bracket member, according to the present invention.
Figure 3:
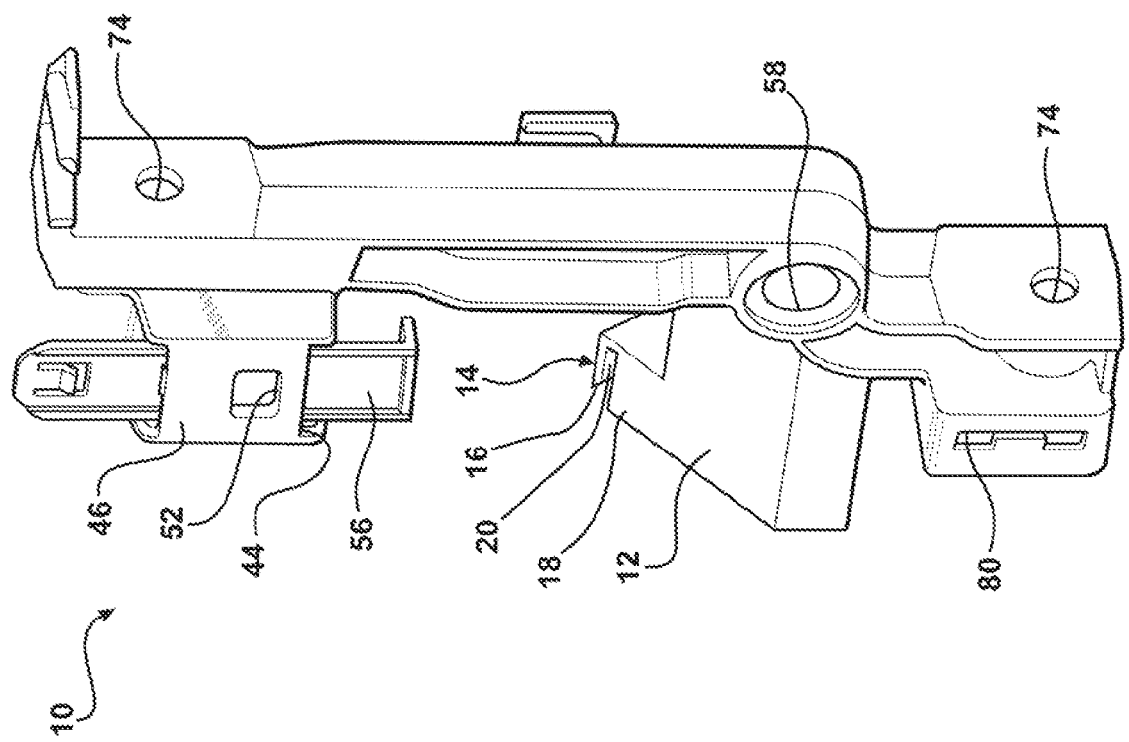
FIG. 3 is a second perspective rear view of a bracket member, according to the present invention.
Figure 4:
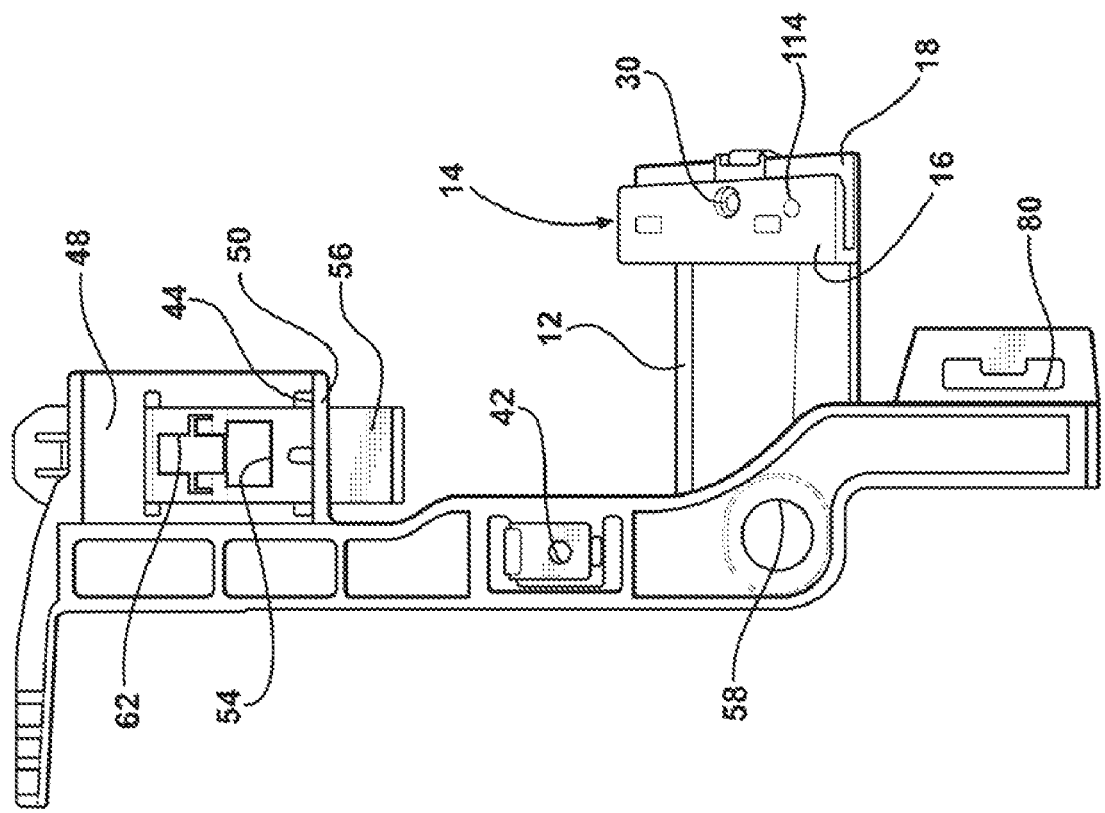
FIG. 4 is a rear view of a bracket member, according to the present invention.

The following description of the preferred embodiment(s) is merely exemplary in nature and is in no way intended to limit the invention, its application, or uses.

Referring to the Figures generally, a bracket member used for providing proper alignment between a series of externally visible components is shown generally at 10. The bracket member 10 includes a fascia attachment 12 having a first attachment structure, or U-bracket 14. The U-bracket 14 includes two flange portions 16,18 separated by a gap 20. The U-bracket 14 connects to more than one externally visible component, such as a fender 22 or a fascia 24. The U-bracket 14 is also used to provide support for the fender 22 and fascia 24 as well. The fender 22 includes a flange 26, and the fascia 24 also includes a flange 28; both the flanges 26,28 are received in between the flange portions of the U-bracket 14. The fascia attachment 12 has a main aperture 30 which extends through both flange portions 16,18 of the U-bracket 14 and aligns with a first aperture 32 on the fascia 24, a second aperture 34 on the fender 22.

Connected to the bracket member 10 is a fender bracket 36 having a third aperture 38 and a fourth aperture 40. The third aperture 38 on the fender bracket 32 is aligned with the main aperture 30 of the U-bracket 14, the first aperture 32 and the second aperture 34. The fender bracket 32 has a fourth aperture 40 which is aligned with a support aperture 42 on the bracket member 10.

The bracket member 10 also includes a slot 44, which is formed as part of the bracket member 10. The slot 44 is made by a first substantially flat portion 46 which is offset from a second substantially flat portion 48 and an extension 50. The first flat portion 46 has an aperture 52 which is selectively in alignment with a corresponding aperture 54 formed on a tab 56. The apertures 52,54 are used along with a socket 58 for allowing one of the externally visible components mentioned above, in this case a headlamp 60, to be attached to the bracket member 10. When the apertures 52,54 are aligned, the aperture 52 and corresponding aperture 54 will receive a protrusion having a detent (not shown) from the headlamp 60. Once inserted, the tab 56 is moved in the slot 44 so as to offset the aperture 52 from the corresponding aperture 54 of the tab 56. When the tab 56 is moved in the slot 44, the aperture 54 becomes offset from the aperture 52, and the aperture 54 has a narrow portion 62 which engages the detent of the headlamp 60. The headlamp 60 also includes a ball (not shown) which is inserted into the socket 58, allowing for the position of the headlamp 60 to be changed, and compensate for various tolerances. Once the protrusion is inserted through the apertures 52,54, and the ball is inserted into the socket 58, headlamp 60 is secured to the bracket member 10.

Figure 5:
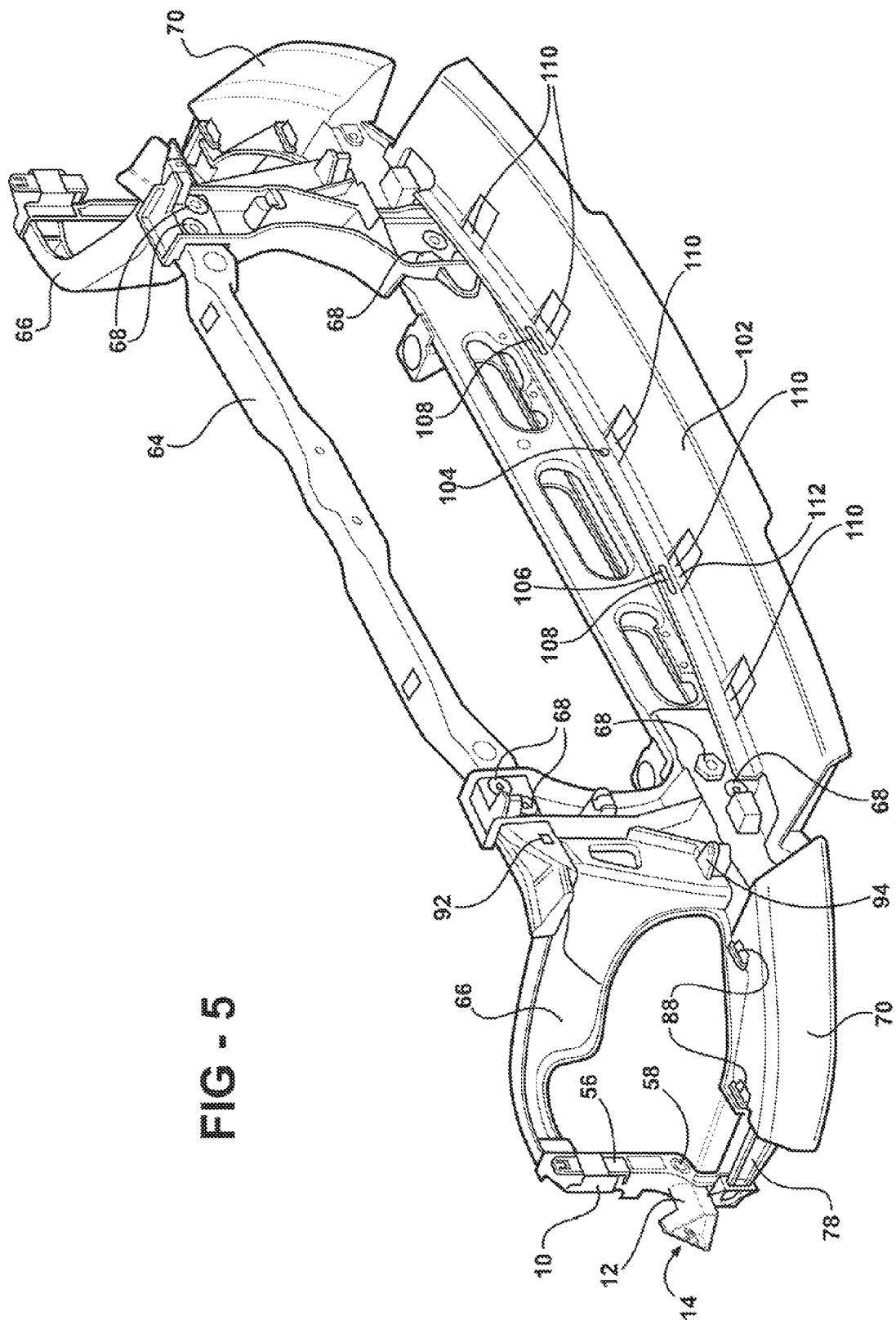
FIG. 5 is a perspective view of a front end assembly support system for a top cap with the headlamp removed, according to the present invention.

The bracket member 10 is used as part of a system used for supporting various types of finish panels in an automobile, such as the fender 22 and fascia 24 mentioned above. Referring to FIG. 5, the system includes a carrier member, which in this embodiment is a carrier 64 which is used for supporting various vehicle components, such as a radiator, hood, fan, fan shroud, windshield washer fluid container, various hoses, and the like. Attached on each side of the carrier 64 are lamp supports 66. The lamp supports 66 are attached through the use of an adhesive bond and rivets 68. The adhesive bond is placed between the carrier 64 and the lamp supports 66, the rivets 68 are then attached and hold the carrier 64 and lamp supports 16 together until the adhesive bond cures.

Attached to each of the lamp supports 66 are the bracket members 10, and a support member 70. The bracket member 10 is attached to the carrier 64 through the use of fasteners, shown as bolts 72 inserted through a set of apertures 74 formed as part of the bracket member 10, and a set of corresponding threaded apertures (not shown) formed in the carrier 64, best seen in FIGS. 1-3, 5 and 6. The lamp supports 66 along with the bracket member 10 forms a component support structure. Also attached to each of the headlamp supports 66 is a center support 76. The support member 70 and the center support 76 are used for supporting a contoured finish panel of the body of a vehicle, which in this embodiment is the fascia 24. The fascia 24 is used to provide an aesthetically pleasing appearance and is typically the same color as the remaining body components.

The support member 70 is connected to the bracket member 10 through the use of an extension 78 which is connected to a lower bracket 80 through the use of a snap-fit connection, which allows the extension 78 to pivot about the bracket 80; the support member 70 is also connected to the lamp support 66 through the use of a fastener, such as a screw (not shown) inserted through a slot 82 in a flange 84 and through a corresponding aperture 86 in the lamp support 66. The support member 70 also includes snaps 88, the function of which will be described later, and a contoured surface 90 for supporting the fascia 24.

The headlamp 60 is also attached to the lamp supports 66 through the use of an upper connector 92 and a lower connector 94. The upper connector 92, lower connector 94, the slot 44 and tab 56, and the ball and socket 58 form a second attachment structure for connecting the headlamp 60 to the lamp support 66 and bracket member 10. The flange 84 and the slot 82, and the corresponding aperture 86 form an attachment point; the extension 78 and bracket 80 form a third attachment structure for attaching the support member 70 to the lamp support 66 and the bracket member 10.

Figure 10:
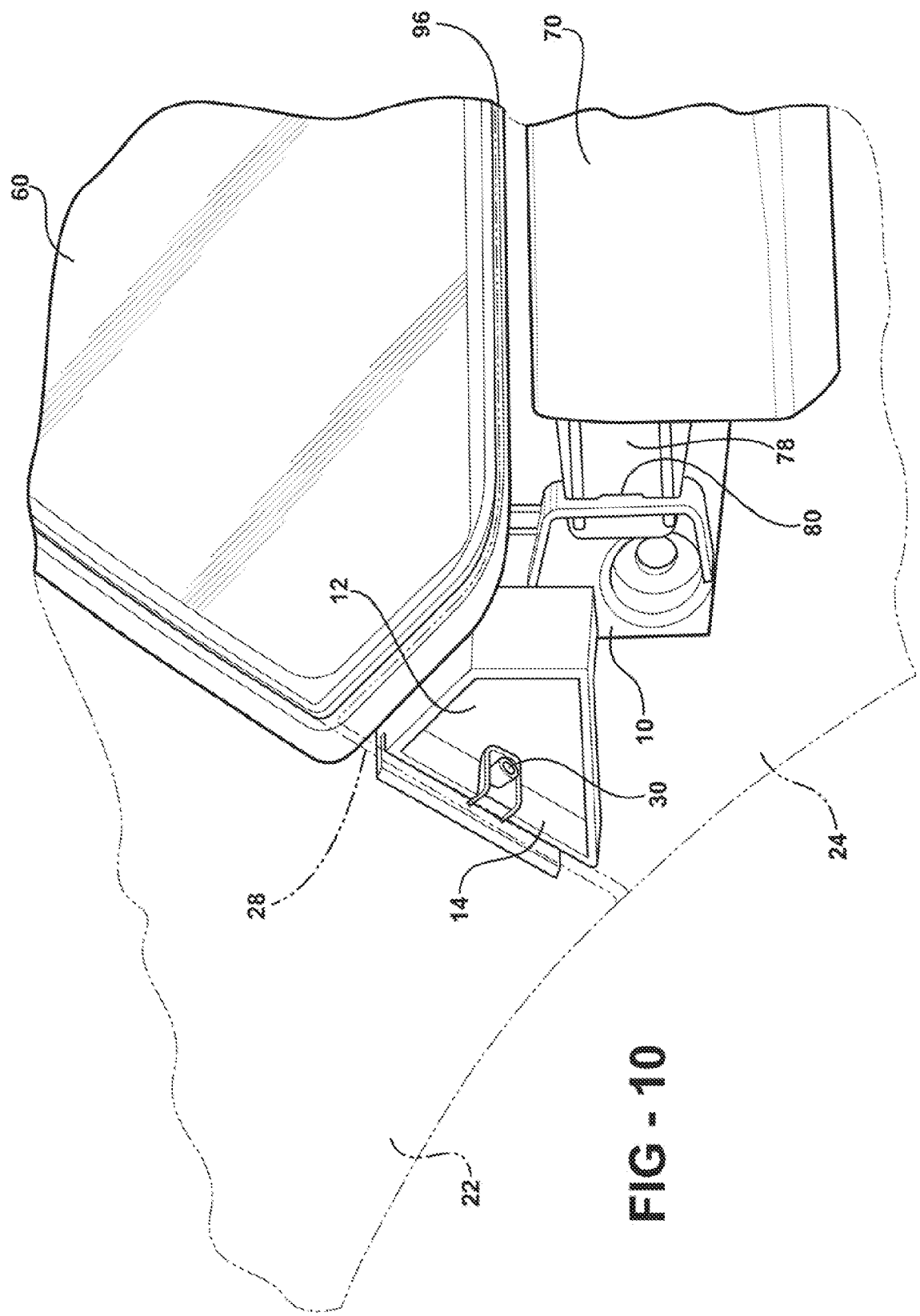
FIG. 10 is a perspective front view of a bracket member used in with the fender and top cap attached, according to the present invention.
Figure 11:
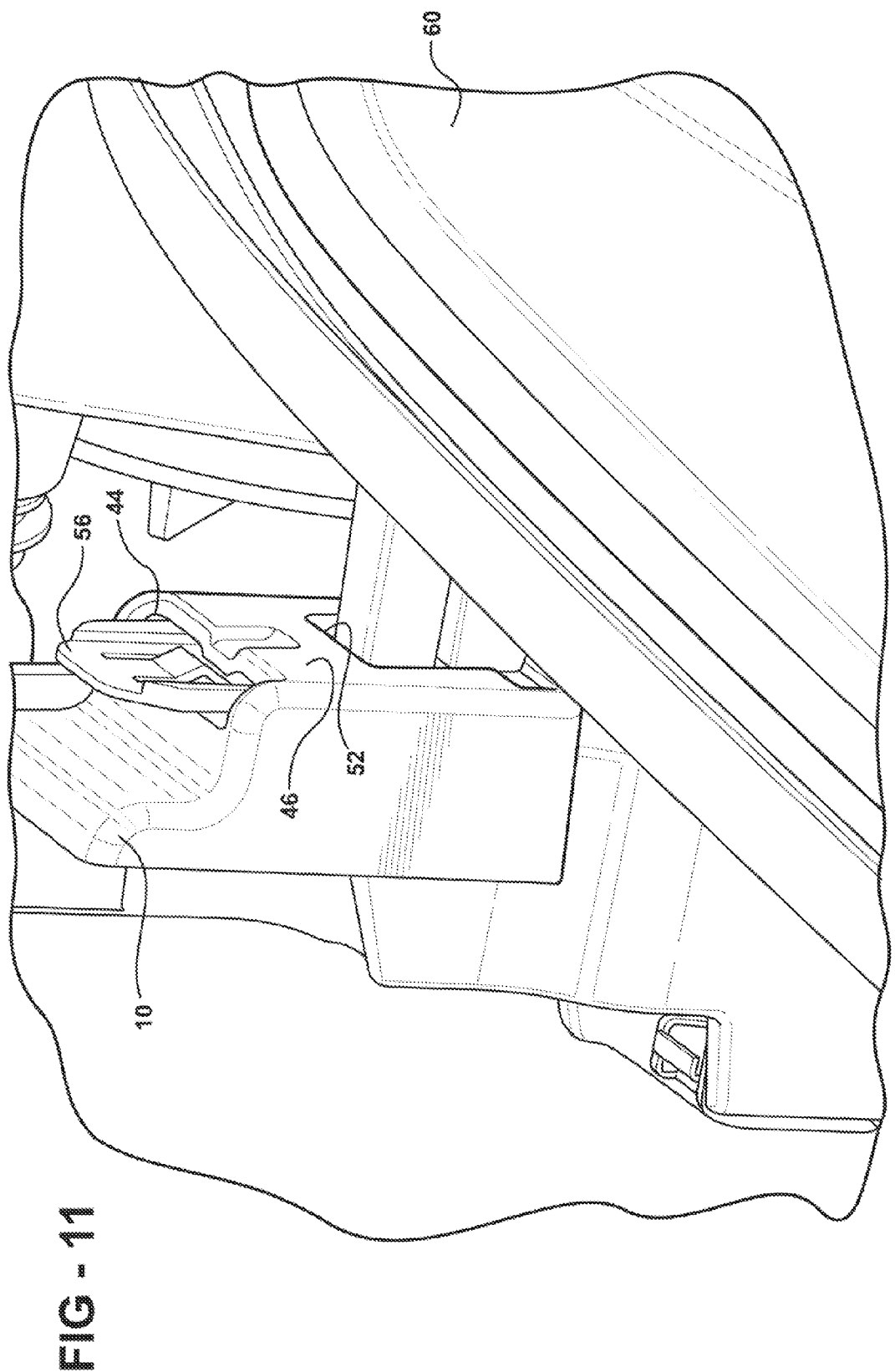
FIG. 11 is an enlarged perspective view of a bracket member with the headlamp attached, according to the present invention.
Figure 12:
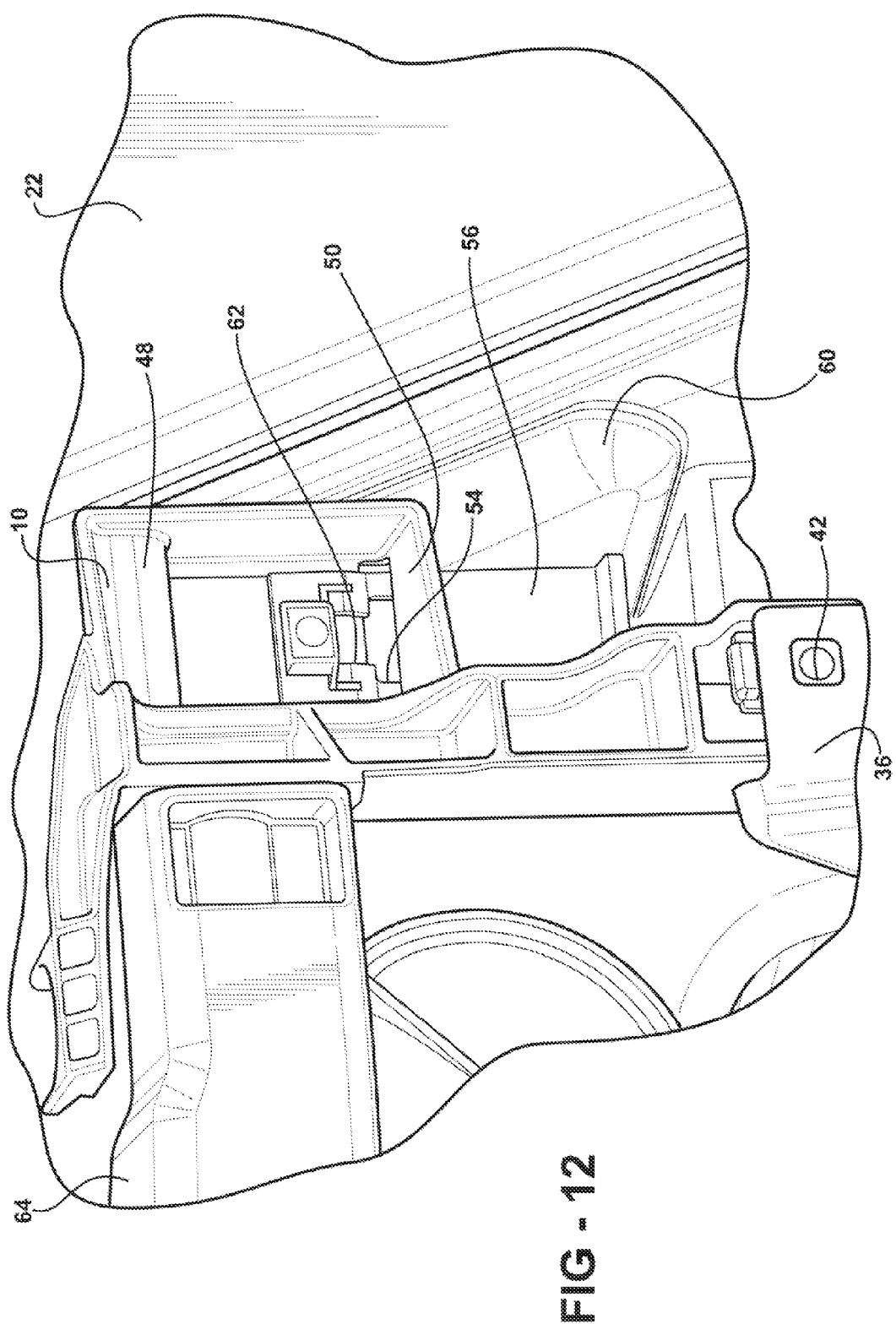
FIG. 12 is an enlarged rear perspective rear view of a bracket member for a fender and a top cap, according to the present invention.
Figure 13:
FIG. 13 is a side perspective view of a bracket member for a top cap with the headlamp attached, according to the present invention.
Figure 14:
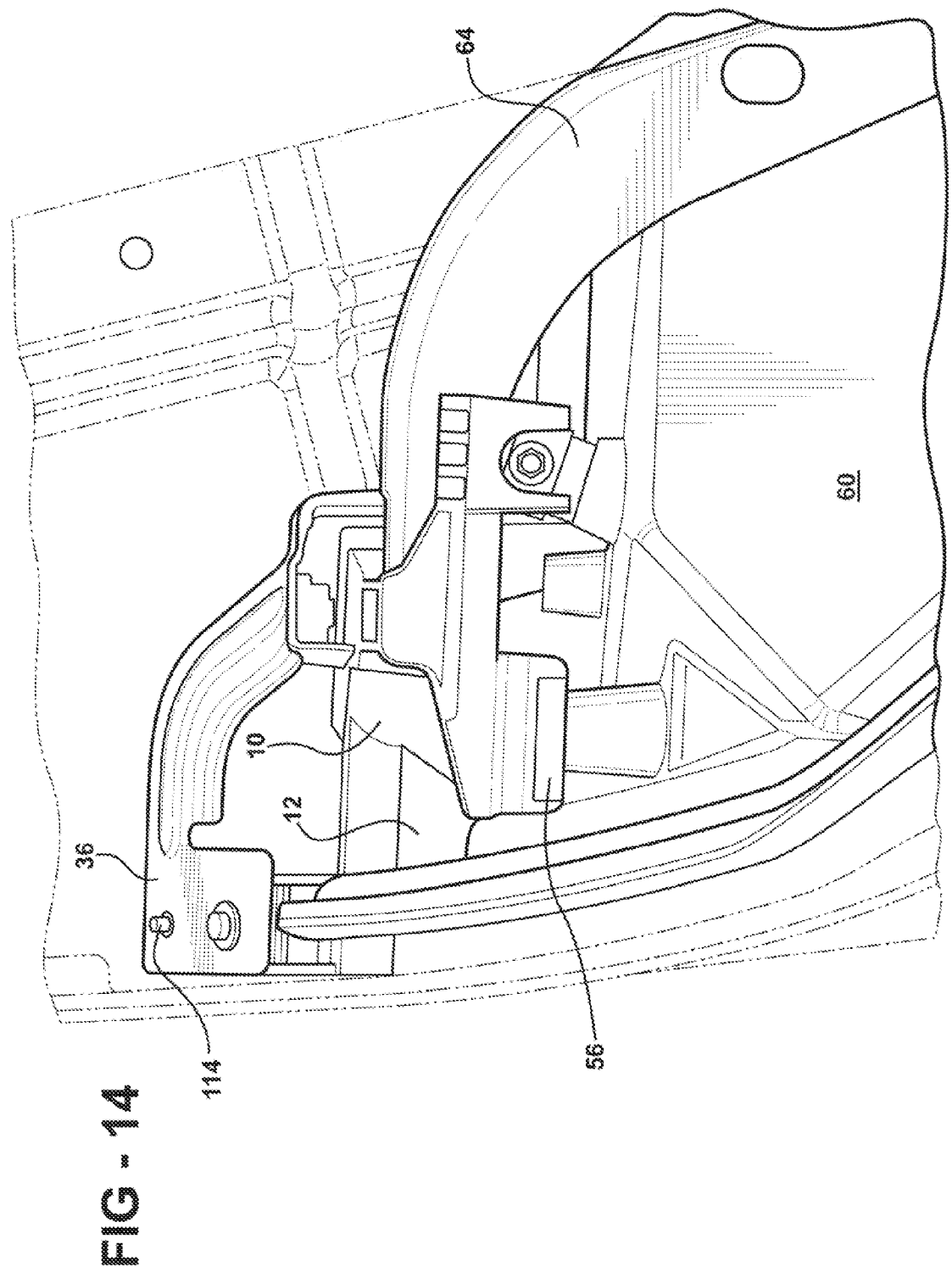
FIG. 14 is a perspective top view of a bracket member with the top cap and fender attached, according to the present invention.

Once the headlamp 60 is attached to the lamp support 66 and the bracket member 10, the position of the support member 70 can be adjusted using the extension 78 and bracket 80, along with the fastener inserted through the slot 82 and into the aperture 86. The slot 82 is shaped so as to allow the position of the support member 70 to be adjusted during assembly relative to the lamp support 66. Adjusting the position of the support member 70 relative to the lamp support 66 secures the position of the support member 70, and therefore secures the position of the fascia 24, relative to the headlamp 60, allowing for control over the amount of space between the headlamp 60 and fascia 24. The space between the headlamp 60 and fascia 24 is shown as a gap, generally at 96, in FIG. 10.

Figure 6:
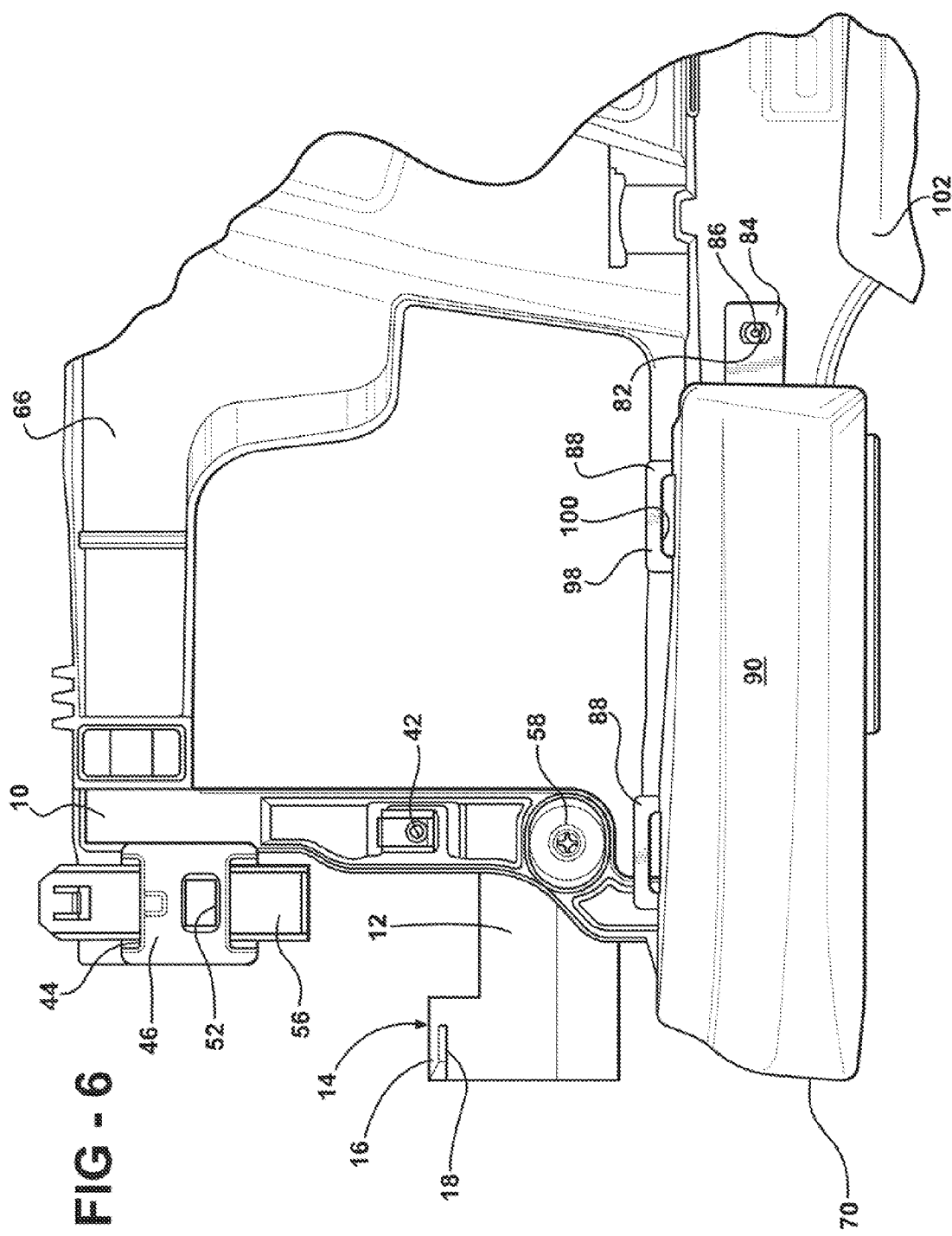
FIG. 6 is an enlarged front view of a bracket member attached to a headlamp support, according to the present invention.
Figure 7:
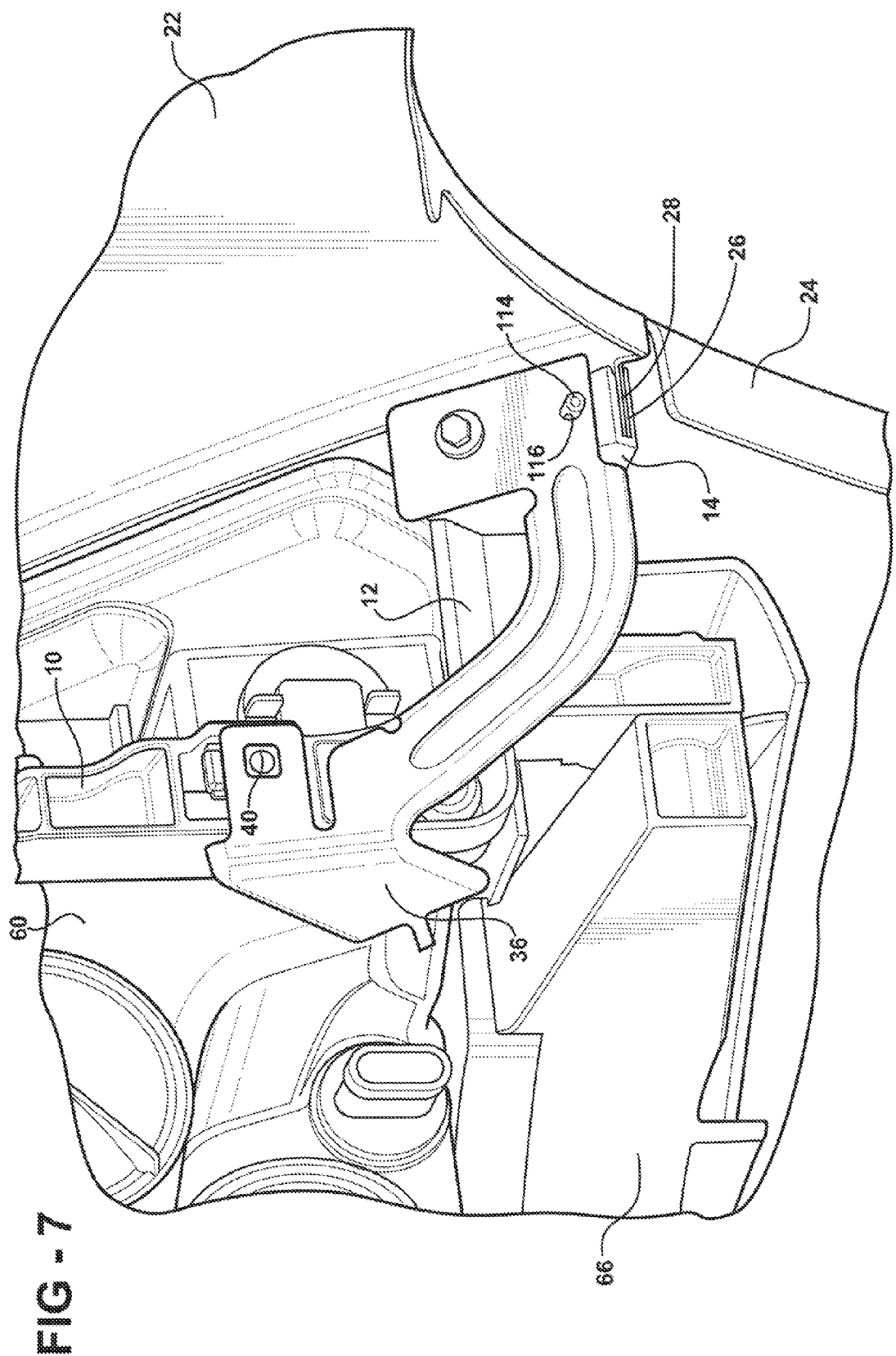
FIG. 7 is a rear perspective view of a fender bracket used with a bracket member, according to the present invention.
Figure 8:
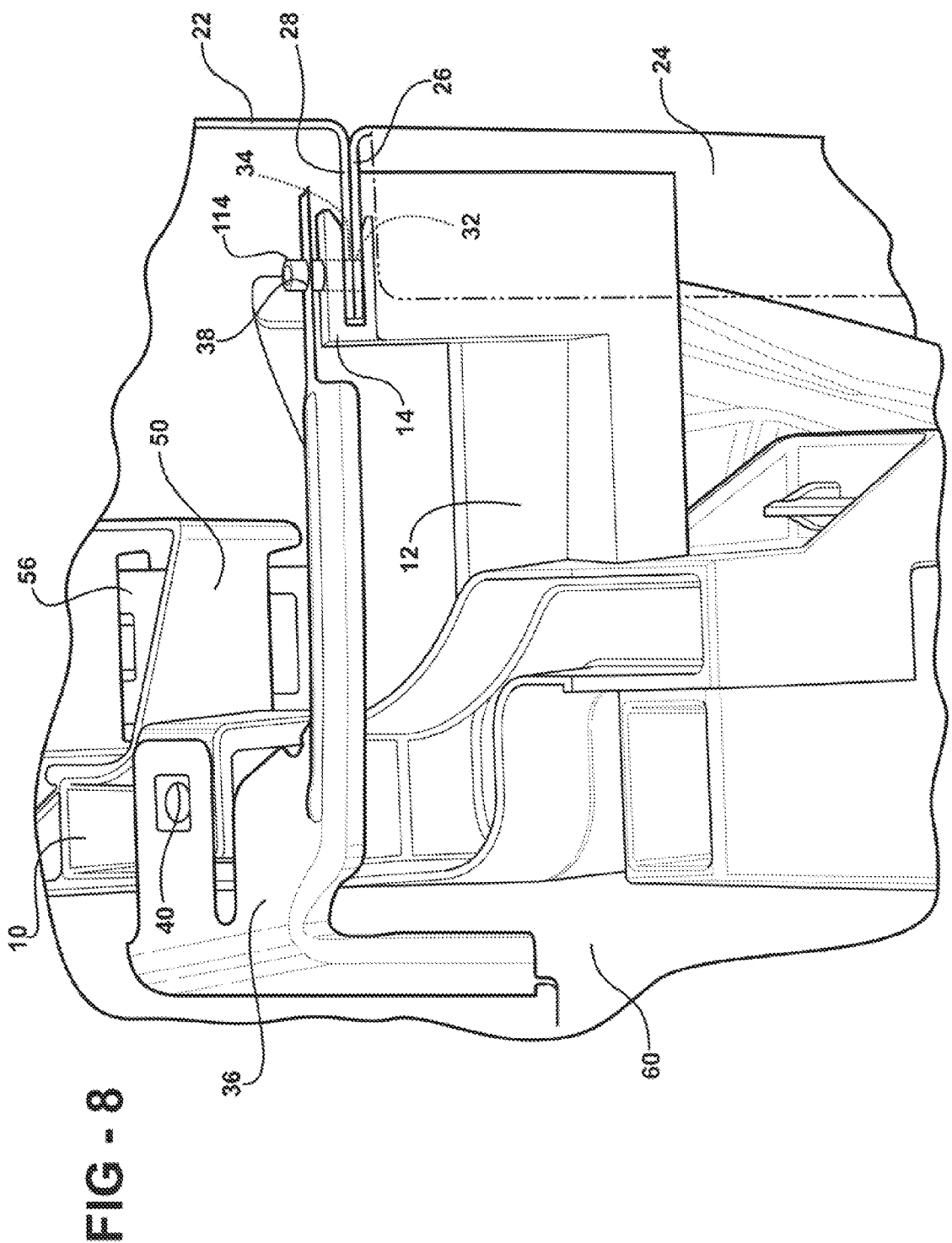
FIG. 8 is an enlarged bottom perspective view of a fender bracket and a bracket member, according to the present invention.
Figure 9:
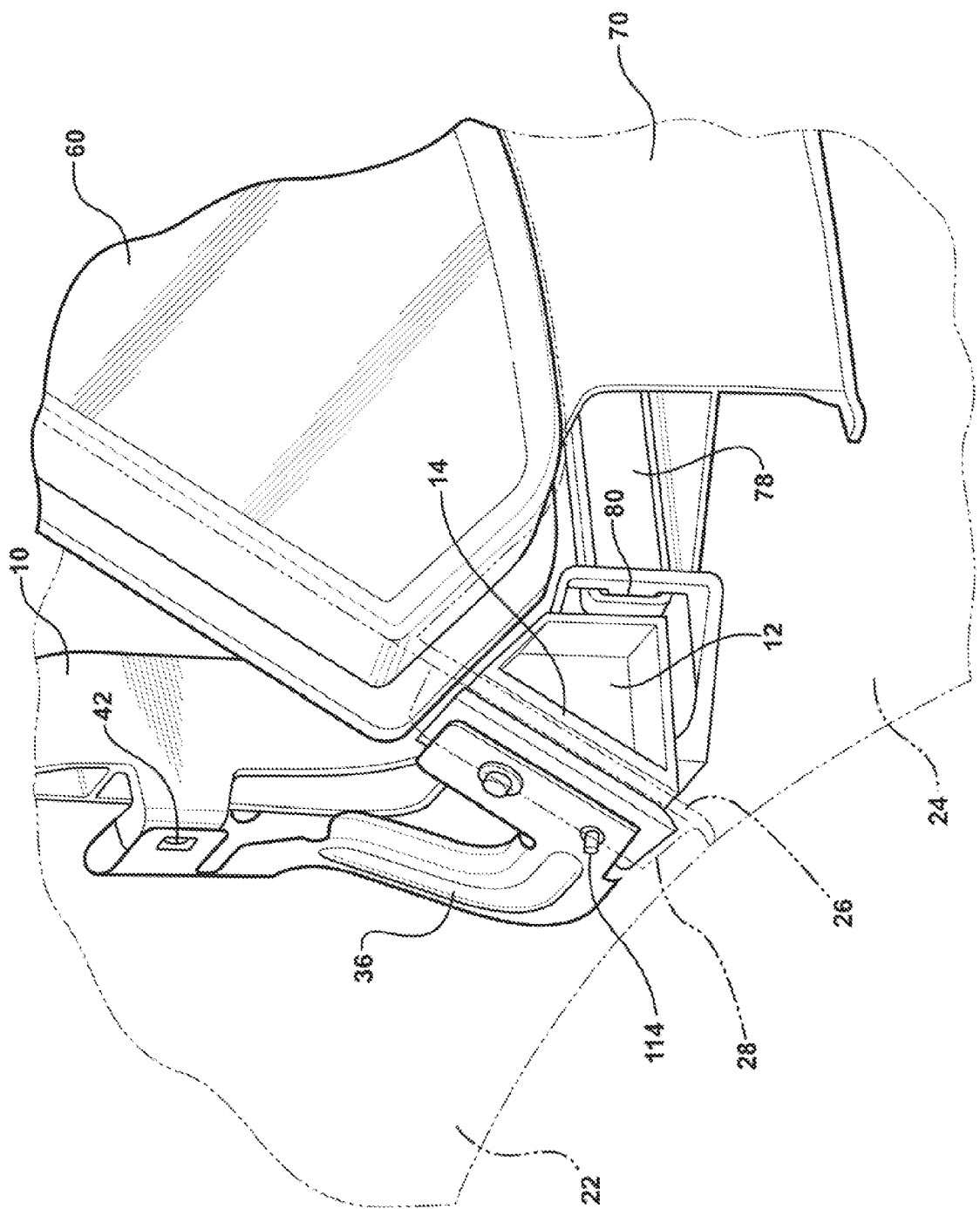
FIG. 9 is a second enlarged perspective view of a fender bracket and a bracket member with the headlamp attached, according to the present invention.

Referring to FIGS. 5 and 6, the fascia 24 includes a set of extensions (not shown) having an angled tab (also not shown) which are received into the snaps 88 of the support member 70. The snaps 88 have a frame member 98 and an aperture 100. The angled tab of the fascia 24 is inserted through the aperture 100, and through the use of a snap-fit connection, the extensions of the fascia are connected to the frame member 86. The contoured surface 90 of the support member 70 provides support for the fascia 24.

The center support 76 also includes a contoured surface 102, which also provides support for the fascia 24. The center support 76 includes a centering aperture 104, a series of grille snaps 106 having an aperture 108, and top snaps 110 having an aperture 112. Another externally visible member, which in this embodiment is an exterior body component in the form of a grille (not shown), is attached to the center support 76 through the use of the grille snaps 106. The grille has extensions (not shown) which include angled tabs, and are inserted into the grille snaps 106 in the same manner as the extensions of the fascia 24 are inserted into the snaps 88. The grille is properly aligned with the center support 76 by using the centering aperture 104. After the grille is attached, the fascia 24 is attached using a set of extensions (not shown) having an angled tab and contact surface which are similar to the extensions inserted into the snaps 88, and are inserted into the top snaps 110 in a similar manner that the extensions are inserted into the snaps 88.

As the fascia 24 is attached to the support member 70, the flange 26 of the fascia 24 is inserted into the U-bracket 34 of the fascia attachment 12, along with the flange 28 of the fender 30. A single fastener, such as a screw, is inserted through the main aperture 30, the first aperture 32, the second aperture 34, and third aperture 38, rigidly connecting the fender 22, fascia 24, and the bracket member 10. The third aperture 38 of the fender bracket 36 is aligned with the main aperture 30 of the U-bracket 34 because of a guide pin 114 which extends through a secondary aperture 116 on the fender bracket 36.

The center support 76 is formed such that once the grille and the fascia 24 are both attached to the center support 76, the desired distance between the grille and fascia 24 is achieved to provide an aesthetically pleasing appearance. The top snaps 110, and extensions of the fascia 24 form a first attachment assembly for connecting the fascia 24 to the center support 76, and the grille snaps 106 along with the extensions of the grille form a second attachment assembly for connecting the grille to the center support 76.

It should be noted that the fascia 24 could also be replaced with a top cap. The top cap would also have extensions which would be received by the snaps 88 of the support member 70 and the top snaps 110 of the center support 76, and supported by the contoured surface 90 of the support member 70 and the contoured surface 102 of the center support 76 in the same manner as the fascia 24.

While it has been shown that the bracket member 10 has been used with the carrier 64 and lamp supports 66, the bracket member 10 is made through a forming process, such as injection molding, and can be made to fit any type of vehicle having any type of fascia 24 or top cap.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A bracket member controlling the relative positioning between more than one externally visible component of an automobile, comprising:
    a U-bracket formed as part of a bracket member, said U-Bracket having a first flange portion substantially parallel to a second flange portion, and a main aperture extending through said first flange portion and said second flange portion;
    a first substantially flat portion offset from a second substantially flat portion and an extension, forming a slot, an aperture formed in said first flat portion, said first substantially flat portion, said second substantially flat portion, and said extension are formed as part of said bracket member;
    a tab having an aperture, said tab slidably disposed within said slot, and said aperture of said tab is selectively in alignment with said aperture of said first substantially flat portion;
    a lower bracket formed as a portion of said bracket member;
    more than one externally visible component further comprising:
        a fascia having a flange, and a first aperture formed in said flange of said fascia; and
        a fender having a flange, and a second aperture formed in said flange of said fender, wherein said flange of said fascia and said flange of said fender are inserted between said first flange portion and said second flange portion such that said first aperture and said second aperture are substantially aligned with said main aperture, and a first fastener is inserted through said first aperture, said second aperture, and said main aperture, thereby securing the relative position of said fender and said fascia relative to one another, and said bracket member.

2. The bracket member for controlling the relative positioning between more than one externally visible component of an automobile of claim 1, further comprising:
    a fender bracket having a third aperture, a fourth aperture, and a secondary aperture;
    a guide pin located in proximity to said main aperture, and disposed on one of said flange portions of said U-bracket; and
    a support aperture formed as a portion of said bracket member, and said fender bracket is attached to said bracket member to allow said first fastener to be inserted through said third aperture, said main aperture, said first aperture, and said second aperture, and said fourth aperture is substantially in alignment with said support aperture to allow a second fastener to be inserted through said fourth aperture and said support aperture, thereby securing said fender bracket to said bracket member, and said guide pin to extend through said secondary aperture.

3. The bracket member for controlling the relative positioning between more than one externally visible component of an automobile of claim 1, further comprising:
    a support member for supporting one of said more than one externally visible component of an automobile; and
    an extension formed as a portion of said support member, wherein said extension formed as a portion of said support member is selectively received into said lower bracket of said bracket member.

4. A bracket member for controlling the relative positioning between more than one externally visible component of an automobile, comprising:
    a U-bracket formed as part of a bracket member, said U-bracket having a first flange portion substantially parallel to a second flange portion, and a main aperture extending through said first flange portion and said second flange portion;
    a first substantially flat portion offset from a second substantially flat portion and an extension, forming a slot, an aperture formed in said first flat portion, said first substantially flat portion, said second substantially flat portion, and said extension are formed as part of said bracket member;
    a tab having an aperture, said tab slidably disposed within said slot, and said aperture of said tab is selectively in alignment with said aperture of said first substantially flat portion;
    a lower bracket formed as a portion of said bracket member,
    a socket formed as a portion of said bracket member; and
    a headlamp assembly having a ball which is selectively received into said socket, and a protrusion with a detent, where said protrusion is inserted through said aperture of said tab and said aperture of said flat portion, and said tab is moved in said slot such that said tab engaged said detent of said protrusion.

5. The bracket member for controlling the relative positioning between more than one externally visible component of an automobile of claim 4, further comprising:
    said aperture of said tab having a narrow portion, and said narrow portion of said aperture of said tab engages said detent when said tab is moved in said slot to engage said detent of said protrusion.

6. The bracket member for controlling the relative positioning between more than one externally visible component of an automobile of claim 4, further comprising:
    a support member for supporting one of said more than one externally visible component of an automobile; and
    an extension formed as a portion of said support member, wherein said extension formed as a portion of said support member is selectively received into said lower bracket of said bracket member.

* * * * *